W. H. EDMUNDS.
TIME EXPOSURE CALCULATING METER.
APPLICATION FILED JAN. 18, 1915.
1,178,442.
Patented Apr. 4, 1916.
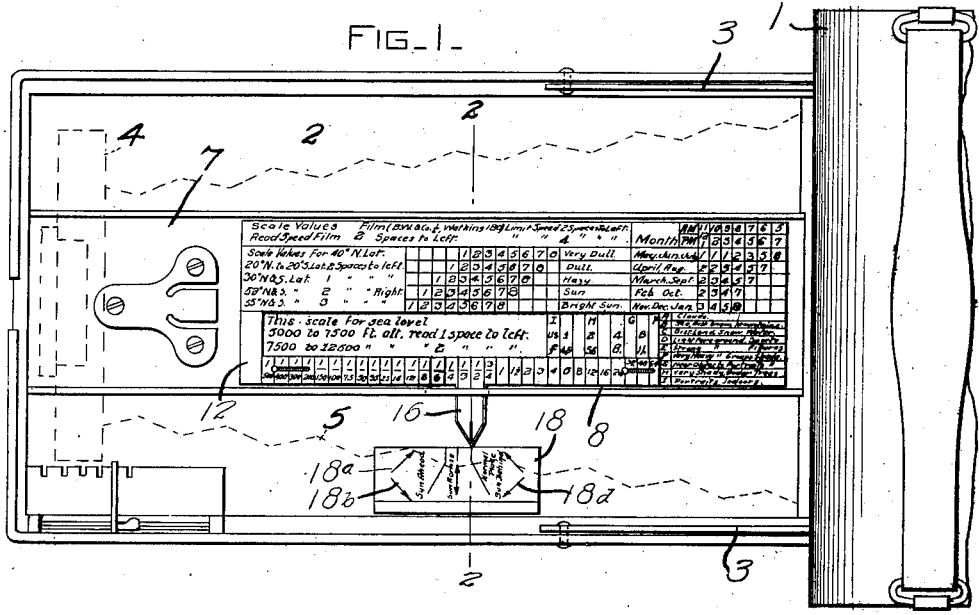
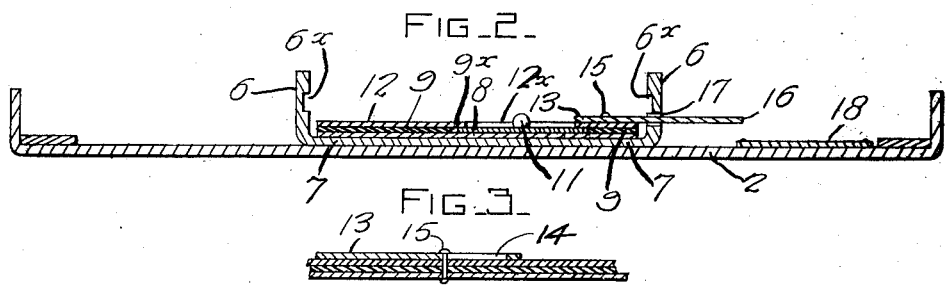
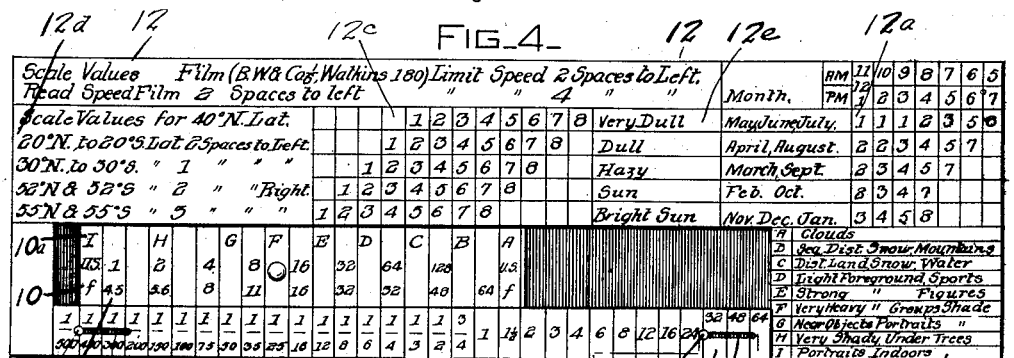
WITNESSES
INVENTOR
WILLIAM H. EDMUNDS
BY Munn & Co.
ATTORNEYS

UNITED STATES PATENT OFFICE.

WILLIAM H. EDMUNDS, OF DENVER, COLORADO.

TIME-EXPOSURE-CALCULATING METER.

1,178,442.  Specification of Letters Patent.  Patented Apr. 4, 1916.

Application filed January 18, 1915. Serial No. 2,829.

*To all whom it may concern:*

Be it known that I, WILLIAM H. EDMUNDS, a citizen of the United States, residing at Denver, in the county of Denver and State of Colorado, have invented certain new and useful Improvements in Time-Exposure-Calculating Meters, of which the following is a specification.

My invention relates to improvements in time exposure calculating meters and it consists in the combinations, constructions and arrangements herein described and claimed.

An object of my invention is to provide a meter which is to be used in connection with a photographic camera for calculating the time of exposure necessary to produce the best results under prevailing conditions.

A further object of my invention is to provide a device of the type described which is designed to be located in a particular position upon a camera, the operation of the meter depending for its accuracy upon its proper position on the camera.

A further object of my invention is to provide a device of the type described having slidable parts and fixed parts, the fixed parts being secured to the camera and the slidable parts being movable on the fixed parts, both the slidable and fixed parts having scales and pointers adapted to register in various positions whereby the time exposure may be accurately ascertained.

Other objects and advantages will appear in the following specification and the novel features of the device will be particularly pointed out in the appended claims.

My invention is illustrated in the accompanying drawings forming a part of this application, in which:

Figure 1 is a sectional view of the device as applied to a camera. Fig. 2 is a plan view on the line 2—2 of Fig. 1. Fig. 3 is a section through a portion of the device along the line 3—3 of Fig. 4, and Fig. 4 is a plan view of the scales of the meter.

In carrying out my invention I make use preferably of a camera known as the drop front type, in which a casing 1 (see Fig. 1) is provided with a door 2, which may be let down to a position at right angles to the casing and which is held in this position by means of braces 3. The door 2 finds a support for the lens frame 4, shown in dotted lines in Fig. 1, so that the bellows 5 may be extended to the proper focusing position. The extension of the bellows is facilitated by means of a track formed by the upstanding flanges 6 of a plate 7 secured to the door 2 as shown in Fig. 2, the flanges being preferably grooved as shown at $6^x$, to receive guide members (not shown) on the lens frame. The construction thus far described is old and forms no part of my invention except in so far as these parts coöperate with those hereinafter described.

The meter proper comprises a rectangular backing sheet or plate 8, this plate being firmly secured to the bottom of the members 7 as shown in Fig. 2. Above the backing plate 8 is a spacing member 9 which is provided with a rectangular opening $9^x$, in which a slide 10 which is provided with a handle 11 may move. An upper portion 12 is provided which has an opening $12^x$ smaller than the opening $9^x$ in order to provide retaining shoulders or flanges which extend over the slidable member 10 as shown in Fig. 2, thus permitting the latter to slide freely but to prevent its displacement.

Disposed above a portion of the plate 12 and on one edge thereof is a slidable member 13, which is provided with slots 14 arranged to receive pins 15 which extend into the members 12, 9 and 8, these pins serving as stop members to limit the movement of the slidable member 13. The latter is provided with an outstanding arm or pointer 16 which extends through an opening 17 in one of the flanges 6, this opening being sufficiently large to permit a movement of the slide 13 in either direction. Secured to the door 2 is a plate or sheet 18, the edge of the arm 16 extending just over the edge of the plate 18.

The members 8, 9, 10, 12, 13 and 18 may be made of any suitable material such as metal, wood, celluloid or the like. It is essential, however, that the side edges of these members extend parallel with the axis of the lens of the camera and I desire to call particular attention at this point, that the locations of these scales with respect to the camera is important. A scale or meter for instance which is arranged on the camera at an angle to the axis of the lens could not carry out the purposes of this invention. The camera therefore does more than to form a mere supporting member for the scale.

Consider now the tables or data on the plate 12. At the upper right hand corner at 12$^a$ are shown relative light values for the different times of the day at different months, while below these values are indicated at 12$^b$ the names of objects to be photographed. At 12$^c$ are disposed scale values for different conditions of light. At 12$^e$ are indicated the conditions of light. The slidable member 10 bears at its upper portion a horizontal row of letters 10$^a$ which correspond to the letters indicating the objects shown in the table 12$^b$, and also horizontal rows of figures 10$^b$ indicating different diaphragm stops. The slidable strip 13 bears numerals indicating times of exposure. The member 12 also bears data indicating the speed of the film or plate and if a limit speed is to be used the corrections in the normal reading are given. Corrections for latitude are also given in the table 12$^d$.

Consider now the scale 18, this is provided with arrows 18$^a$, 18$^b$, 18$^c$, 18$^d$ and 18$^e$, these arrows indicate the direction from which the sunlight is coming. There are also three marks 18$^x$, 18$^y$ and 18$^z$. When the sun is ahead the pointer 16 should be placed to register with the mark 18$^x$. When the sun is directly across or at approximately right angles to the lens the pointer should be set at 18$^y$, and when the sun is behind at 18$^z$ as will be explained later.

From the foregoing description of the various parts of the device the operation thereof may be readily understood. The parts of the meter being secured to the camera as stated above, it is only necessary to set up the camera at any given place and point it toward the object to be taken. Suppose it is desired to take a picture of athletic sports at 2 p. m. in October, in very bright sun, which is shining from behind, at sea level, and at an average place in the United States, that is to say lying between latitude 30 degrees N. to 50 degrees N., with a camera equipped with the regular film or plate, having the Watkins speed of 180. At the right hand end of the scale we find that the light value for the month of October at 2 p. m. is 3. Athletic sports is found in the table 12$^b$ and corresponds with the figure D. The diaphragm stop scale 10 is now moved until the letter D comes into registration with the figure 3 in the table 12$^c$. In this case, the figure 3 is in the bottom row of horizontal figures which corresponds with a bright sun, but if the sun were not bright, D of course would be moved one space to the right, since the figure 3 in the second horizontal column is one space to the right, and if the light is "hazy" another space to the right and so on. The slide 13 is now moved over until the pointer registers with the mark 18$^z$ on the scale 18, since the sun is behind. If now we are using a particular diaphragm stop, say $f$ 4.5, then the time of exposure will be found directly underneath the figure indicating the stop to be used, in this case the figures $\frac{1}{300}$ sec. Should the sun be shining directly across instead of behind, the slide 10 would be moved to the point 18$^y$ on the scale 18, and this would, of course, bring the figure $\frac{1}{200}$ opposite the figures 4.5. When it is desired to photograph an object in rapid motion and which requires the shortest exposure time allowable, when using a film having a 180 Watkins speed, in other words if "limit speed" is desired, one should read two spaces to the left instead of directly underneath the diaphragm reading. In the first instance given, the exposure is for a stationary object, but if it should be a rapidly moving object, then two spaces to the left would be $\frac{1}{500}$ whereas in the second instance it would be $\frac{1}{400}$.

As will be seen from Fig. 1, the upper portion of the backing 8 bears legends indicating that the scale is to be used at sea level, but if the altitude is between 5000 to 7500 feet then one space to the left should be read. Suppose it is desired to take a photograph of marine or water scenes at 10 a. m. in July at an altitude of 6000 feet, latitude of 45 degrees N. with a hazy sun and using the regular film speed. Proceeding as before we find that the light value at 10 a. m. in July is 1, while water scenes come under the subjects C. The letter C on the slidable scale 10 should be brought under the figure 1 corresponding with the word hazy. This is the third column to the right. With the sun behind, the slide 13 is moved to the right. With a diaphragm stop $f$ 8, the time exposure which corresponds with the stop is found to be $\frac{1}{150}$ but in accordance with the table of correction we should read one space to the left, and hence the proper time exposure would be $\frac{1}{200}$ sec. Where the operator is between 20 degrees N. latitude and 20 degrees S. he should read two spaces to the left on the time exposure scale in order to get the correct reading since of course the sun is stronger in these latitudes. From 20 degrees N. to 30 degrees N. (or from 20 degrees S. to 30 degrees S.) he should read one space to the left as set forth in table 12$^d$, between 50 degrees and 52 degrees N.

or S. two spaces to the right and between 52 degrees and 55 degrees three spaces to the right.

It will thus be seen that I have provided a device which may be attached to a camera for indicating the proper time of exposure, with a stop of given size. The meter being attached to the camera is always present and one does not have to refer to a separate table as for instance in a pocket meter or other device, but the time may be indicated by setting up the camera and moving the slides as described. It will be obvious that the part of the scale which indicates the direction from which the light is coming is an important feature in this device since the reading on the scale depends upon the direction in which the camera is facing.

I am aware that exposure meters are not broadly new and I do not claim such broadly.

What I claim is:

1. The combination of a fixed scale having marks indicating the direction of light, a scale slidable with respect to said fixed scale and having numerals indicating exposure times; a second slidable scale disposed adjacent to said first named slidable scale and having numerals indicating diaphragm stop values, and a row of characters indicating groups of objects to be photographed; and a fixed scale adjacent to said second mentioned slidable scale and provided with numerals indicating light values, certain characters on said second named slidable scale being arranged to register with numerals on said last named fixed scale and other characters on said second named slidable scale being arranged to register with certain numerals on said first mentioned slidable scale.

2. The combination of a fixed scale provided with lines indicating the direction of light and with scale marks, a slidable scale carried by the camera and having a pointer arranged to register with said scale marks, said slidable scale being provided with numerals indicating exposure times; a second slidable scale disposed adjacent to said first named slidable scale and having numerals indicating diaphragm stop values, and a row of characters indicating groups of objects to be photographed; and a fixed scale adjacent to said second mentioned slidable scale and on the opposite side from said first mentioned slidable scale and provided with numerals indicating light values, certain characters on said second named slidable scale being arranged to register with numerals on said last named fixed scale and other characters on said second named slidable scale being arranged to register with certain numerals on said first mentioned slidable scale.

3. The combination of a fixed scale and provided with marks indicating the direction of light and having scale marks, a slidable scale having a pointer adapted to register with each of said marks on said fixed scale and being provided with columns of figures denoting exposure times, means for limiting the movement of said slidable scale, a second slidable scale disposed adjacent to said first mentioned slidable scale and provided with numerals indicating diaphragm stop values on the side adjacent to said first mentioned slidable scale and having characters indicating groups of objects to be photographed on the opposite side, a fixed scale adjacent said second mentioned slidable scale and on the opposite side from said first mentioned slidable scale and being provided with columns of numerals indicating light values, said second mentioned slidable scale being movable independently of said first mentioned slidable scale.

4. The combination with a camera, of a fixed scale secured to said camera and having marks indicating the direction of light, and a series of scale marks extending transversely of the optical axis of the lens, a scale carried by the camera and adapted to slide in a direction parallel to the optical axis of the lens of the camera, means for limiting the movement of said slidable scale, said scale having a series of columns of numerals extending transversely of the direction of movement of the scale, said numerals representing exposure times, a second scale slidably disposed with respect to said first scale and having a series of columns, certain of said columns being arranged to register with columns on the first mentioned scale, said second mentioned slidable scale being provided with a row of numerals indicating diaphragm stop values and with a row of characters indicating groups of objects to be photographed, a fixed scale on the opposite side of said second named slidable scale from said first named slidable scale and provided with a series of columns parallel to the columns on both of said slidable scales and containing numerals indicating light values and arranged to register with certain of said group indicating characters on said second named slidable scale in various positions of the latter.

5. In a time exposure meter, a fixed scale having marks indicating the direction of light and scale marks, a slidable scale having an arm or a pointer arranged to register with said scale marks in various positions of the slide and being provided with numerals indicating exposure times, a second fixed scale having indicating characters, and a second slidable scale disposed between said second fixed scale and said first named slidable scale and having a row of indicating characters adjacent to the characters of said second named fixed scale, certain of the characters of the row on the slidable scale being arranged to register with certain characters on said second named fixed scale, said second named slidable scale also being provided with a row of characters indicating diaphragm stop values, certain of said characters in said last named row being arranged to register with certain of said numerals indicating exposure time on said first named slidable scale.

WILLIAM H. EDMUNDS.

Witnesses:
C. A. WILLFONG,
J. E. HESTON.